Figure 1:
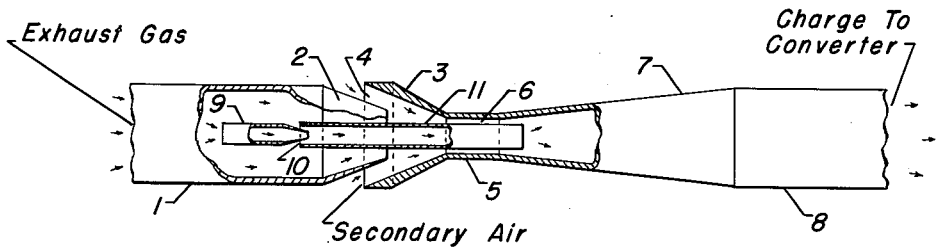

Feb. 27, 1962  C. F. GERALD  3,022,934
SELF-REGULATING INJECTOR
Filed Aug. 24, 1960

INVENTOR:
Curtis F. Gerald

BY: Chester J. Giuliani
James R. Hootson, Jr.
ATTORNEYS

United States Patent Office 3,022,934
Patented Feb. 27, 1962

3,022,934
SELF-REGULATING INJECTOR
Curtis F. Gerald, El Paso, Tex., assignor to Universal Oil Products Company, Des Plaines, Ill., a corporation of Delaware
Filed Aug. 24, 1960, Ser. No. 51,569
11 Claims. (Cl. 230—103)

This invention relates to apparatus for the commingling of two or more fluid streams and more particularly it concerns a jet pump of unique design whose aspiration characteristic curve, e.g., the curve obtaining when the flow ratio of injected fluid to motive fluid is plotted on the ordinate and motive fluid flow is plotted on the abscissa, may be altered over a wide range and in general has a negative slope, in contradistinction to the positive slope characteristic of conventional jet pumps. More particularly, the instant invention relates to apparatus for injecting secondary or combustion air into a flowing stream of combustible waste products, for example, waste products comprising the exhaust gases of internal combustion engines such as the spark ignition gasoline engine, diesel engine, butane engine, and the like.

The desirability of removing certain compounds from vehicular exhaust gases is of importance at the present time. The unavoidably incomplete combustion of hydrocarbon fuels by the gasoline or diesel engine results in the generation of substantial amounts of unburned hydrocarbons and other undesirable waste products which are discharged to the atmosphere through the exhaust line. With the ever-increasing concentration of automobiles, particularly in urban areas, the resultant discharge of these undesirable products into the atmosphere may reach high proportions. These combustion products are known to react with atmospheric oxygen under the influence of sunlight to produce smog. Such waste products include, for example, unsaturated hydrocarbons, carbon monoxide, aromatics, partially oxidized hydrocarbons such as alcohols, ketones, aldehydes, acids, and various oxides of nitrogen and sulfur. Methods for converting vehicular exhaust gases to harmless materials, such as, for example, to carbon dioxide and water, may be classified into two broad areas: (1) catalytic conversion, and, (2) non-catalytic or thermal conversion. In the catalytic method, the exhaust gases leaving the engine are passed, with or without heating or cooling, into contact with a suitable conversion catalyst and the conversion products of the resulting reactions are thence discharged into the atmosphere. In general, the preferred conversion reactions involve more or less complete oxidation of combustibles, and to this end it is necessary to provide sufficient oxygen, obtained from air or other oxygen-containing gas, in the exhaust gases prior to contact with the catalyst. In the thermal method, the exhaust gases are simply heated to, or maintained at, a sufficiently high temperature, in the presence of oxygen, so as to burn without utilization of a catalyst. With either method it is necessary to provide at least a stoichiometric amount, and preferably an excess amount, of oxygen or air in the exhaust gases. It is not feasible to manipulate the carburetor in order to provide such excess air since this would seriously reduce the efficiency and/or power of the engine; and, therefore, it is usually desirable to separately add the required amount of air to the exhaust gases at a point between the exhaust valve ports of the engine and the catalytic or thermal zone located downstream therefrom. Such excess air is also termed "secondary air," as distinguished from the primary air injected by the carburetor and employed to support combustion of the fuel within the engine cylinders proper.

A preferred means of adding secondary air is with a jet pump or injector serially connected in, or forming a part of, the exhaust gas conduit and disposed upstream from the conversion zone. Jet pumps are well known in the art of fluid transport and only a brief description of the principal elements thereof is necessary here. In essence, a jet pump consists of an inlet nozzle arranged to discharge into a venturi-shaped diffuser section. The diffuser generally consists of a throat section having a short length of constant cross-sectional area and downstream therefrom a gradually expanding cross-section to increase the area to a value equal to or greater than that of the injector inlet. A conduit for conducting injected fluid connects with the interior of the injector at a point immediately downstream from the nozzle opening. A stream of motive fluid is passed through the nozzle and is thereby formed into a high velocity jet which passes into the diffuser and creates a region of low pressure at the upstream end thereof, into which the injected fluid is entrained or aspirated. The diffuser functions to mix the motive fluid and injected fluid and to convert the residual velocity of the mixture into pressure.

A jet pump is known variously, and somewhat arbitrarily, as an injector, ejector, exhaustor, eductor, aspirator, etc., depending upon the physical state of motive fluid and injected fluid employed, i.e., whether liquid, gas or condensable vapor, as well as upon the primary function of the jet pump, i.e., whether used to exhaust, to compress, or to mix. Structurally, however, they are all essentially identical. For the sake of convenience, the term "injector" will be used herein in a generic sense as designating a device for injecting one fluid into another fluid while utilizing a high velocity jet of the latter in the manner aforesaid.

Conventional injectors have a positive-slope aspiration characteristic, that is, an increase in the flow rate of motive fluid will produce a proportional or greater-than-proportional increase in the flow rate of injected fluid whereby the concentration of injected fluid in the combined stream leaving the injector increases with increasing motive fluid flow, and conversely.

When an injector is employed to inject air into an exhaust gas stream, the exhaust gas itself serves as the motive fluid, the secondary air being the injected fluid; when injector means is applied to the exhaust gas stream of an internal combustion engine, especially a spark ignition engine operated under widely varying conditions of speed and load as in the case of a motor vehicle, peculiar difficulties are thereby encountered. The highway operation of a motor vehicle is customarily divided into four phases, namely, the conditions of idle, acceleration, cruise and deceleration. At idle and deceleration, most spark ignition engines operate with a richer fuel:air ratio than during the open throttle operation of acceleration and cruise. The secondary air requirements for satisfactory conversion of the exhaust gas are hence larger, relative to exhaust gas flow, at such rich mixture, low engine speed operation; in other words, the mass ratio of secondary air aspirated to exhaust gas must be greater at low engine speed, and consequently at low exhaust gas flow, than at high engine speed, corresponding to high exhaust gas flow. If the injector is designed to aspirate the large amount of secondary air required at idle and deceleration, the nozzle size must be relatively small and consequently the back pressure on the spark ignition engine is high and causes poor engine performance at cruise or acceleration, as well as a very rapid burning out of engine exhaust valves; on the other hand, if the injector is designed within the limits of back pressure at maximum gas flow whereby the nozzle size becomes somewhat larger, insufficient air is injected at idle and deceleration. A conventional injector is thus seen to have an aspiration characteristic which makes it unsuitable for such applications.

The present invention obviates these difficulties through the provision of a secondary or control nozzle which is connected in parallel with the primary nozzle and is arranged to discharge through a secondary mixing tube or diffuser which bypasses a portion of the motive fluid around the primary nozzle. The control nozzle-secondary diffuser combination has a normal positive-slope aspiration characteristic, that is, the injected fluid:motive fluid ratio increases as the flow rate of motive fluid increases; therefore, as the total flow of motive fluid increases, an increased proportion thereof is removed upstream from the primary nozzle before the motive fluid discharges therefrom into the main diffuser, into which the injected fluid is also aspirated by the jet action of the motive fluid merging from the primary nozzle. The net quantity of motive fluid available for aspiration is thus reduced according to the portion thereof which is bypassed, and correspondingly a lesser quantity of injected fluid is aspirated. The aspiration characteristic curve of the injector has a generally negative slope whose particular shape depends upon the relative capacities and individual characteristics of the primary and secondary nozzles.

In a broad embodiment, the present invention provides an injector comprising in combination first and second mixing tubes open at their downstream ends; first and second convergent nozzles each having an enlarged fluid inlet section and a discharge orifice of reduced cross-section, the inlet section of said second nozzle being disposed within the inlet section of said first nozzle and said orifices being adjacent to and in open communication with said first and second mixing tubes respectively through the upstream ends of the tubes; an injected fluid inlet port in said first mixing tube contiguous to the discharge orifice of said first nozzle; fluid bypass means connecting the interior of the inlet section of said first nozzle with the interior of said second mixing tube at a point contiguous to the discharge orifice of said second nozzle; and the open downstream end of said second mixing tube communicating with the interior of said first mixing tube at a point downstream from said injected fluid inlet port.

A more specific embodiment of this invention relates to an injector comprising in combination first and second mixing tubes open at their downstream ends; a first convergent nozzle terminating in a discharge orifice which is adjacent to the upstream end of said first mixing tube and is in open communication with the interior thereof; an injected fluid inlet port in said first mixing tube contiguous to said discharge orifice; a second convergent nozzle concentrically disposed within said first nozzle and terminating in a restricted opening which is adjacent to the upstream end of said second mixing tube and is in open communication with the interior thereof, said upstream end being open and spaced from said first nozzle to form an annular passageway therebetween connecting the interior of said first nozzle with the interior of said second mixing tube, said second mixing tube being concentrically disposed within said first nozzle and extending through said discharge orifice into said first mixing tube and terminating at a point therein which is downstream from said injected fluid inlet port.

Another specific embodiment of the invention is directed to an injector comprising in combination first and second mixing tubes open at their downstream ends; a first convergent nozzle terminating in a discharge orifice which is adjacent to the upstream end of said first mixing tube and is in open communication with the interior thereof; an injected fluid inlet port in said first mixing tube contiguous to said discharge orifice; an open-ended flow-diverting conduit, the upstream end of which is transversely disposed within said first nozzle, extending through a wall thereof; a second convergent nozzle connected to the downstream end of said flow-diverting conduit and terminating in a restricted opening which is adjacent to the upstream end of said second mixing tube and is in open communication with the interior thereof; a fluid bypass conduit connected at one end thereof to said first nozzle between the upstream end of said flow-diverting conduit and said discharge orifice and connected at the other end thereof to said second mixing tube at a point contiguous to said restricted opening, the downstream end of said second mixing tube being connected to said first mixing tube at a point therein which is downstream from said injected fluid inlet port.

Figure 2:
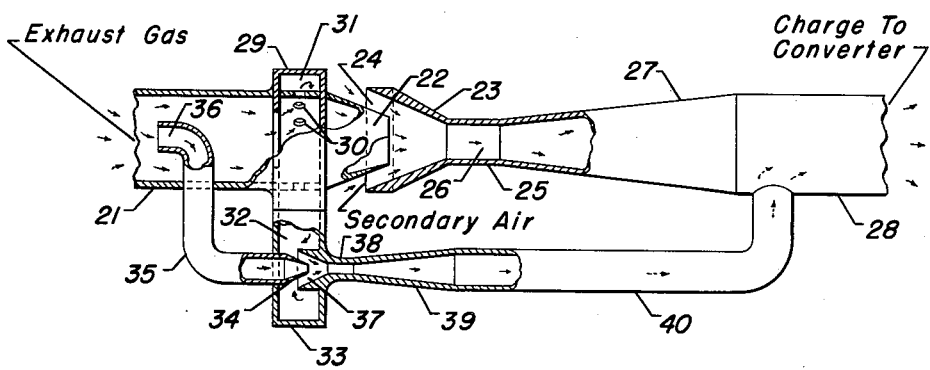
Figure 3:
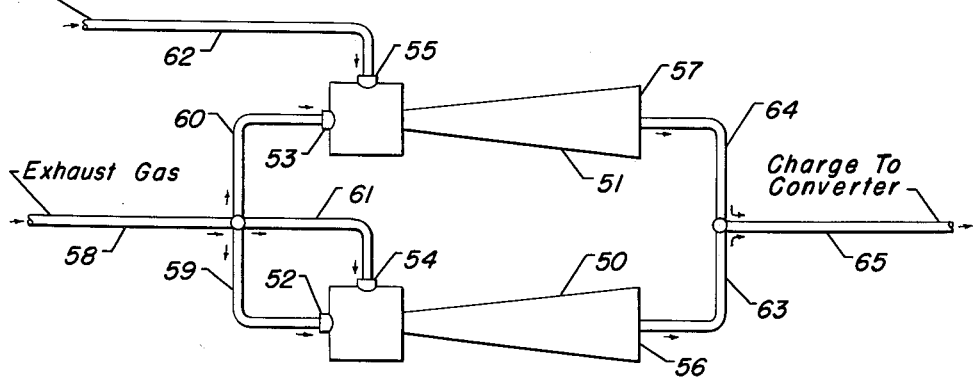

These and other embodiments and features of the invention will be more thoroughly explained hereinbelow and particularly with reference to the accompanying drawing of which FIGURE 1 illustrates one embodiment of the invention utilizing an internal control nozzle, FIGURE 2 illustrates another embodiment utilizing an external control nozzle, and FIGURE 3 illustrates two conventional injectors which are interconnected in such a manner as to achieve a certain measure of self-regulation.

It is intended that the drawing is for the purpose of illustrating and not limiting the invention to the particular apparatus herein disclosed and that all equivalent structures will come within its broad scope. It will further be appreciated that although the invention will be discussed with reference to its specific utility in admixing secondary air with exhaust gases, the use of the apparatus is not to be so limited and may be employed to advantage for the commingling of any two or more fluid streams, whether liquid, gas, mixed phase, or containing finely-divided solids.

In FIGURE 1 there is shown a partial sectional view of one embodiment of the invention. Inlet conduit 1, which is connected to the exhaust manifold of an internal combustion engine (not shown), terminates at its downstream end in a primary convergent nozzle 2 which is arranged to discharge into a primary mixing tube which, in this embodiment, is a convergent-divergent nozzle comprising a convergent section 3, a short throat section 5 of constant cross-sectional area, and a divergent section or diffuser 7. Inlet section 3 is open-ended and of larger inside diameter than nozzle 2 and is concentrically aligned therewith to form an annular passageway or injected fluid inlet port 4 communicating with the interior of convergent section 3. A secondary or control nozzle 9 is concentrically disposed within inlet section 1 and is arranged to discharge into secondary mixing tube 11, which, in this embodiment, is simply an open-ended elongated cylinder extending from a point upstream of the discharge orifice of nozzle 2 into the primary mixing tube and terminating at a point therein substantially downstream from annular passageway 4, such as in diffuser 7. Tube 11 is of smaller diameter than throat section 5 and is coaxially aligned therewith to form an annular channel 6. Nozzle 9 is spaced from tube 11 to form an annular passageway 10 connecting the interior of inlet section 1 with the interior of tube 11 at a point contiguous to the discharge orifice of nozzle 9. Nozzle 9 and tube 11 may be structurally supported by any suitable means, omitted from the drawing for the sake of simplicity, which may include, for example, radial struts, perforated webbing, segmented ring members, etc., connected to the interior walls of inlet section 1, nozzle 2, and/or the primary mixing tube; similarly, nozzle 2 may be maintained in rigid spaced relation to convergent section 3 by suitable strut members, cross-ties, or other connecting means whose selection and placement will be readily apparent to the skilled mechanic. The downstream end of diffuser 7 is connected via outlet conduit 8 to appropriate catalytic or thermal exhaust gas conversion apparatus (not shown); alternatively, it may be desirable to omit conduit 8 and to fabricate the converter integrally with diffuser 7.

The operation of the injector is as follows: a stream of exhaust gas enters inlet section 1 and encounters first the open upstream end of control nozzle 9, which functions in the manner of a pitot tube, converting linear gas velocity into static pressure within nozzle 9. A portion of the incoming exhaust gas is, therefore, diverted into and through nozzle 9, being formed into a jet, and passed through secondary mixing tube 11; nozzle 9 and tube 11 function as an injector having a normal positive aspiration characteristic, and additional exhaust gas is thus aspirated into tube 11 through passageway 10. The remaining undiverted exhaust gas discharges through nozzle 2 into convergent section 3, the jet action of the gas creating a low pressure region therein and causing air from the atmosphere to be drawn in via annular passageway 4. The air-exhaust gas mixture flows through annular channel 6 into diffuser 7, into which the unaerated bypass stream of exhaust gas flowing through tube 11 is also introduced. The expanding diffuser section 7 aids the thorough mixing of air and exhaust gas and promotes pressure recovery by transforming linear velocity of the gas into pressure. Assume now that an increase occurs in the flow rate of exhaust gas entering inlet section 1. An increased quantity of gas will enter control nozzle 9, the increment being approximately in the proportion that the transverse cross-sectional area of the inlet section of nozzle 9 bears to that of inlet section 1; there will also be an increased flow in the annular space between nozzle 9 and section 1. However, because of the aforesaid positive aspiration characteristic of nozzle 9, a greater quantity of air is also bypassed through passageway 10 into mixing tube 11, and the net quantity of exhaust gas available to form a jet in nozzle 2 for aspirating air through passageway 4 is substantially reduced. The rate of air injection is dependent on the rate of motive fluid discharging from nozzle 2, and because the latter increases to a lesser extent than does the total incoming exhaust gas flow by reason of the aforesaid diversion thereof through secondary mixing tube 11, the concentration or percentage of air in the total aerated charge to the converter decreases as the flow of exhaust gas increases. Correspondingly, the converse behavior obtains upon a decrease in flow of exhaust gas. As previously mentioned, such characteristic is necessary for vehicular applications wherein a higher concentration of secondary air is required for conversion at the low exhaust gas flow conditions of idle and deceleration than at the high exhaust gas flow conditions of cruise and acceleration.

Various modifications of the apparatus of FIGURE 1 will be apparent to those skilled in the art. Inlet section 1 may be considered an integral extended part of nozzle 2. Also, nozzle 2 is shown as having a frusto-conical section, this being the simplest to fabricate, but it may instead have a parabolic or other curvi-linear profile or may, in its simplest form, be a sharp-edged orifice plate suitably affixed to the downstream end of conduit 1. Indeed any equivalent flow-restricting, jet-producing means may be satisfactorily utilized as the primary nozzle. The same considerations also apply to the construction of control nozzle 9.

The primary mixing tube, herein shown as a convergent-divergent nozzle, may instead have only a convergent section, or a divergent section, or it may be a simple tube of constant circular cross-section. Convergent inlet section 3, instead of being laterally spaced from nozzle 2, may be directly connected in fluid-tight contact thereto, in which case the injected fluid inlet port 4 would comprise one or more holes, slots, etc. extending through the wall of section 3 near the discharge orifice of nozzle 2 and spaced in a circumferential or longitudinal pattern, or both circumferentially and longitudinally.

Secondary mixing tube 11, herein shown as a simple open-ended cylinder, may instead have the general convergent-divergent shape of the primary mixing tube in order to provide the desired self-regulating charcteristic of the injector, or it may consist solely of an expanding tapered diffuser section. Tube 11 may have a sealed attachment at its upstream end to the exterior of nozzle 9, and passageway 10 replaced by one or more ports in the upstream end portion of tube 11. The open downstream end of tube 11 may terminate within convergent inlet section 3, or throat section 5, or diffuser 7, as desired; important feature here being that it terminate sufficiently downstream from port 4 so that the fluid issuing from tube 11 will not contribute appreciably to the aspirating force of the main jet of motive fluid emerging from nozzle 2.

The design of FIGURE 1 is particularly desirable from the standpoint of simple and compact construction, as the various elements are telescoped one into the next to provide maximum utilization of space and material. Such considerations are, of course, important for portable and mobile applications. The apparatus of FIGURE 1 is not completely flexible, however, for the reason that the size, and therefore the capacity, of control nozzle 9 is limited by the physical size of nozzle 2 which encloses it. In order to achieve a very large negative-slope characteristic, it may be necessary to make the capacity of the control nozzle substantially exceed that of the primary nozzle, in which case it may be necessary to provide an exteriorally disposed control nozzle and secondary mixing tube.

This latter arrangement is shown in the embodiment of FIGURE 2. Referring now to FIGURE 2, inlet conduit 21 terminates at its downstream end in convergent nozzle 22, which is laterally spaced from, and concentrically aligned with, a convergent-divergent primary mixing tube comprising an open-ended convergent inlet section 23, throat 25, and diffuser 27. Secondary air is injected into the primary mixing tube through annular passageway or injected fluid inlet port 24 formed between nozzle 22 and section 23. An open-ended flow-diverting conduit 35 extends through a wall of inlet conduit 21, which may be considered to be the upstream extension of nozzle 22. The upstream end 36 of conduit 35 is turned through 90° so as to be oriented into alignment with the direction of flow through section 21. An annular piezometer housing 29 circumscribes section 21 at a point between open end 36 of conduit 35 and the discharge orifice of nozzle 22 to form an annular gas-collecting space 31. A plurality of circumferentially spaced holes 30 provide fluid communication between the interior of section 21 and gas-collecting space 31. The lower portion of housing 29 is fitted to an extension chamber 33 whose interior 32 is in open communication with gas-collecting space 31. The downstream end of conduit 35 extends through a wall chamber 33 and terminates in control nozzle 34, which is spaced from and positioned to discharge into a secondary mixing tube comprising convergent inlet section 37, throat 38, and diffuser 39. The downstream end of diffuser 39 is connected via conduit 40 to outlet conduit 28; alternatively, conduit 40 may be connected to communicate with the interior zone 26 of throat 25, or to diffuser 27, or to any convenient point of the primary mixing tube so long as it is downstream from passageway 24.

The operation of the injector of FIGURE 2 is substantially the same as in FIGURE 1. Because the upstream end 36 of conduit 35 is pointed toward the incoming flow, a pitot tube effect is achieved whereby a portion of the exhaust gas is diverted through conduit 35. The diverted portion is formed into a jet in nozzle 34 and passed into section 37; the jet lowers the pressure in spaces 32 and 31, causing additional exhaust gas to be sucked from the main stream thereof through holes 30 into the secondary mixing tube. The piezometer ring structure of housing 29 and holes 30 promote a symmetrical flow pattern which minimizes disturbance of the main jet formed by nozzle 22. Secondary air is injected through annular passageway 24 into convergent inlet section 23, and the combined air and exhaust gas streams are thoroughly mixed and expanded for pressure recovery in diffuser 27. The unaerated bypass stream from conduit 40 is then combined with the aerated stream and the total charge is passed through outlet conduit 28 to the conversion zone.

The same structural variations discussed with reference to FIGURE 1 also apply to FIGURE 2. For example, either the primary mixing tube or the secondary mixing tube, or both, may have the form of a simple tube of constant circular cross-section, or the form of a continuously expanding diffuser section; the upstream ends of the mixing tubes may be attached to their respective nozzles, and ports of various shapes and sizes may be provided in the mixing tubes as functional equivalents of the annular passageways typified by passageway 24. It is also within the scope of this invention to replace annular housing 29 with a simple pipe connected to inlet section 21 at one or more points, and/or to replace extension chamber 33 with a pipe similarly connected to the secondary mixing tube. The upstream end 36 of flow-diverting conduit 35 is preferably concentrically disposed within inlet section 21 in order to promote establishment of a symmetrical flow pattern therein; however, it is within the scope of the instant invention to offset the center of opening 36 from the longitudinal axis of nozzle 22 if such construction should appear desirable.

The external control nozzle arrangement of FIGURE 2 has several advantages; namely, the respective capacities of the primary and control nozzles may be independently altered, as their size is not subject to overriding spacial considerations; and, where desired, the control nozzle may be designed to have a capacity several-fold that of the primary nozzle. Further, the capacity of the primary nozzle is greater for a given nozzle size than in the case of FIGURE 1 because its orifice is unobstructed. It will be seen that conduit 40 not only provides a means for bypassing motive fluid around port 24 but also functions as at least a partial structural support for the primary mixing tube and aids in maintaining the spaced relationship of the latter to nozzle 22.

FIGURE 3 demonstrates the manner in which two conventional injectors can be connected so that the combination behaves like a self-regulating injector. A pair of injectors 50 and 51 are each provided with motive fluid inlet ports 52 and 53, injected fluid inlet ports 54 and 55, and combined fluid outlet ports 56 and 57, respectively. The internals of injectors 50 and 51 are well known and need no elaboration here. Ports 52, 53 and 54 are connected in parallel by means of lines 59, 60 and 61 to line 58, which is connected to a source of exhaust gas. Ports 56 and 57 are parallel-connected by lines 63 and 64 to common discharge line 65. Conduit 62 is connected to a source of secondary air and to the remaining port 55 of injector 51. Injector 50 functions as the control means to absorb the greater proportion of exhaust gas upon an increase in flow through conduit 58; a lesser flow increase thus occurs in line 60 and a less-than-proportional amount of air is aspirated through line 62.

In order to prevent any tendency for feed back, i.e., an increase in flow through line 61 causing a decrease in flow through line 59, line 61 may instead be connected to line 60 at a point downstream from the junction of lines 58 and 59; a valve, a restriction orifice, capillary or other flow-restricting means may also be placed in line 60 upstream from the junction of lines 60 and 61 to furnish a preferential flow path for the exhaust gas entering port 52.

Any of the foregoing embodiments of the injector may be employed to inject materials other than air, or in conjunction with air, into the exhaust gas stream. For example, it may be desirable to treat the exhaust gas chemically, in which case a storage tank containing an appropriate chemical reagent may be connected to passageway 4 of FIGURE 1, passageway 24 of FIGURE 2, or conduit 62 of FIGURE 3. Since the crankcase fumes of an internal combustion engine, comprising cylinder "blow-by," constitute a source of atmospheric contamination by venting out through the air breather pipe, it may often be advantageous to connect the crankcase, as by the breather pipe, to the injector so that such fumes together with air are passed to the conversion zone.

While the present invention is especially adapted to apparatus for injecting secondary air into the exhaust gas of an internal combustion engine, and finds its greatest utility in circumventing the aforesaid peculiar problems associated with such application, it is not intended that the use of apparatus be so limited. Generally speaking, the invention may be employed in any process involving the continuous commingling of two or more fluids wherein the mass ratio of one fluid to the other is to be varied in inverse relationship, and especially wherein conservation of pressure is important. Exemplary applications include the catalytic oxidation of industrial furnace or regenerator flue gases, particularly where such gases vary in quantity and/or combustibles content, the catalytic conversion of noxious off-gases resulting from chemical processes such as the oxidation of naphthalene to phthalic anhydride, the halogenation of hydrocarbons by high-velocity controlled mixing of hydrocarbon and halogen under halogenating conditions, and various others.

I claim as my invention:

1. An injector comprising in combination first and second mixing tubes open at their downstream ends; first and second flow-restricting means each having an enlarged fluid inlet section and a discharge orifice of reduced cross-section, said fluid inlet sections being parallel-connected and said orifices being adjacent to and in open communication with said first and second mixing tubes respectively through the upstream ends of the tubes; an injected fluid inlet port in said first mixing tube contiguous to the discharge orifice of said first flow-restricting means; fluid bypass means connecting the interior of the inlet section of said first flow-restricting means with the interior of said second mixing tube at a point contiguous to the discharge orifice of said second flow-restricting means; and the open downstream end of said second mixing tube communicating with the interior of said first mixing tube at a point downstream from said injected fluid inlet port.

2. An injector comprising in combination first and second mixing tubes open at their downstream ends; first and second convergent nozzles each having an enlarged fluid inlet section and a discharge orifice of reduced cross-section, the inlet section of said second nozzle being disposed within the inlet section of said first nozzle and orifices being adjacent to and in open communication with said first and second mixing tubes respectively through the upstream ends of the tubes; an injected fluid inlet port in said first mixing tube contiguous to the discharge orifice of said first nozzle; fluid bypass means connecting the interior of the inlet section of said first nozzle with the interior of said second mixing tube at a point contiguous to the discharge orifice of said second nozzle; and the open downstream end of said second mixing tube communicating with the interior of said first mixing tube at a point downstream from said injected fluid inlet port.

3. The apparatus of claim 2 further characterized in that the inlet sections of said first and second nozzles are concentric.

4. An injector comprising in combination first and second mixing tubes open at their downstream ends; first and second convergent nozzles each having an enlarged fluid inlet opening and a discharge orifice of reduced cross-section, the inlet opening of said second nozzle being disposed within said first nozzle and said orifices being adjacent to and in open communication with said first and second mixing tubes respectively through the upstream ends of the tubes; an injected fluid inlet port in said first mixing tube contiguous to the discharge orifice of said first nozzle; fluid bypass means connecting the interior of said first nozzle at a point intermediate the inlet opening of said second nozzle and the discharge orifice of said first nozzle with the interior of said second mixing tube at a point contiguous to the discharge orifice of said second nozzle; and the open downstream end of said second mixing tube communicating with the interior of said first mixing tube at a point downstream from said injected fluid inlet port.

5. An injector comprising in combination first and second mixing tubes open at their downstream ends; first and second convergent nozzles each having an enlarged fluid inlet opening and a discharge orifice of reduced cross-section, the inlet opening of said second nozzle being disposed within said first nozzle and said orifices being adjacent to and in open communication with said first and second mixing tubes respectively through the upstream ends of the tubes; the upstream end of said first mixing tube being open and spaced from said first nozzle to form an annular passageway therebetween connecting the exterior of said first mixing tube with the interior thereof; fluid bypass means connecting the interior of said first nozzle at a point intermediate the inlet opening of said second nozzle and the discharge orifice of said first nozzle with the interior of said second mixing tube at a point contiguous to the discharge orifice of said second nozzle; and the open downstream end of said second mixing tube communicating with the interior of said first mixing tube at a point downstream from said annular passageway.

6. The apparatus of claim 5 further characterized in that said first mixing tube comprises a convergent-divergent nozzle member.

7. The apparatus of claim 5 further characterized in that said second mixing tube comprises a convergent-divergent nozzle member.

8. The apparatus of claim 5 further characterized in that said second mixing tube is an elongated open-ended cylinder.

9. An injector comprising in combination first and second mixing tubes open at their downstream ends; a first convergent nozzle terminating in a discharge orifice which is adjacent to the upstream end of said first mixing tube and is in open communication with the interior thereof; an injected fluid inlet port in said first mixing tube contiguous to said discharge orifice; a second convergent nozzle concentrically disposed within said first nozzle and terminating in a restricted opening which is adjacent to the upstream end of said second mixing tube and is in open communication with the interior thereof, said second mixing tube being concentrically disposed within said first nozzle and extending through said discharge orifice into said first mixing tube and terminating at a point therein which is downstream from said injected fluid inlet port; and a fluid bypass port in said second mixing tube contiguous to said restricted opening and connecting the interior of said first nozzle with the interior of said second mixing tube.

10. An injector comprising in combination first and second mixing tubes open at their downstream ends; a first convergent nozzle terminating in a discharge orifice which is adjacent to the upstream end of said first mixing tube and is in open communication with the interior thereof; an injected fluid inlet port in said first mixing tube contiguous to said discharge orifice; a second convergent nozzle concentrically disposed within said first nozzle and terminating in a restricted opening which is adjacent to the upstream end of said second mixing tube and is in open communication with the interior thereof, said upstream end being open and spaced from said first nozzle to form an annular passageway therebetween connecting the interior of said first nozzle with the interior of said second mixing tube, said second mixing tube being concentrically disposed within said first nozzle and extending through said discharge orifice into said first mixing tube and terminating at a point therein which is downstream from said injected fluid inlet port.

11. An injector comprising in combination first and second mixing tubes open at their downstream ends; a first convergent nozzle terminating in a discharge orifice which is adjacent to the upstream end of said first mixing tube and is in open communication with the interior thereof; an injected fluid inlet port in said first mixing tube contiguous to said discharge orifice; an open-ended flow-diverting conduit, the upstream end of which is positioned to face upstream within said first nozzle, extending through a wall thereof; a second convergent nozzle connected to the downstream end of said flow-diverting conduit and terminating in a restricted opening which is adjacent to the upstream end of said second mixing tube and is in open communication with the interior thereof, a fluid bypass conduit connected at one end thereof to said first nozzle between the upstream end of said flow-diverting conduit and said discharge orifice and connected at the other end thereof to said second mixing tube at a point contiguous to said restricted opening, the downstream end of said second mixing tube being connected to said first mixing tube at a point therein which is downstream from said injected fluid inlet port.

References Cited in the file of this patent

UNITED STATES PATENTS

| 2,308,059 | Decker | Jan. 12, 1943 |
| 2,938,464 | Nielsen | May 31, 1960 |

FOREIGN PATENTS

| 472,305 | France | July 31, 1914 |